US012418131B2

(12) United States Patent
Farrell et al.

(10) Patent No.: US 12,418,131 B2
(45) Date of Patent: Sep. 16, 2025

(54) PRIMARY LOCK REINFORCEMENT FOR CONNECTOR LOCKING SYSTEM WITH RESILIENT AND RIGID LOCKING SURFACES

(71) Applicant: Aptiv Technologies AG, Schaffhausen (CH)

(72) Inventors: Jack Farrell, Streetsboro, OH (US); Siddhan Manickam, Salem (IN); Dineshkumar Manoharan, Chennai (IN)

(73) Assignee: Aptiv Technologies AG, Schaffhausen (CH)

( * ) Notice: Subject to any disclaimer, the term of this patent is extended or adjusted under 35 U.S.C. 154(b) by 277 days.

(21) Appl. No.: 18/210,218

(22) Filed: Jun. 15, 2023

(65) Prior Publication Data

US 2024/0372288 A1 Nov. 7, 2024

(30) Foreign Application Priority Data

May 3, 2023 (IN) ............................ 202341031486

(51) Int. Cl.
*H01R 13/434* (2006.01)
*H01R 13/627* (2006.01)
(Continued)

(52) U.S. Cl.
CPC ....... *H01R 13/434* (2013.01); *H01R 13/6272* (2013.01); *H01R 13/639* (2013.01); *H01R 43/20* (2013.01)

(58) Field of Classification Search
CPC ............................ H01R 13/434; H01R 13/425
(Continued)

(56) References Cited

U.S. PATENT DOCUMENTS 5,385,491 A * 1/1995 Fry .................... H01R 13/4368 439/752
11,189,953 B2 11/2021 Baza et al.
(Continued)

FOREIGN PATENT DOCUMENTS

DE 19613051 C1 7/1997

OTHER PUBLICATIONS

"Extended European Search Report"; European Patent Office: Mailed on May 28, 2024; 8 Pages.

*Primary Examiner* — Neil Abrams
(74) *Attorney, Agent, or Firm* — Billion & Armitage

(57) ABSTRACT

A connector assembly includes a connector body having a terminal cavity and a cantilevered resilient primary terminal locking arm configured to secure a terminal. The terminal defines a terminal release ramp and a locking ridge. The connector assembly also includes a primary lock reinforcement (PLR) device having a cantilevered resilient secondary terminal locking arm that inhibits the PLR device from moving from a pre-staged position to a fully staged position prior to the terminal being inserted into the terminal cavity due to a blocking condition between the secondary terminal locking arm and a cavity wall of the terminal cavity. The secondary terminal locking arm flexes outwardly as the terminal is inserted within the terminal cavity, thereby clearing the blocking condition. The PLR device has a side wall that inhibits outward flexing of the primary terminal locking arm.

20 Claims, 6 Drawing Sheets

(51) Int. Cl.
*H01R 13/639* (2006.01)
*H01R 43/20* (2006.01)

(58) Field of Classification Search
USPC .......................................................... 439/595
See application file for complete search history.

(56) References Cited

U.S. PATENT DOCUMENTS

| | | | |
|---|---|---|---|
| 11,515,660 B2 | 11/2022 | Aleman et al. | |
| 11,545,777 B2 | 1/2023 | Sundarakrishnamachari et al. | |
| 2010/0151730 A1* | 6/2010 | Saur | H01R 13/4365 439/595 |
| 2013/0023163 A1* | 1/2013 | Glick | H01R 13/422 439/752 |
| 2014/0127928 A1 | 5/2014 | Kida | |
| 2022/0052483 A1 | 2/2022 | Sundarakrishnamachari et al. | |
| 2024/0372288 A1* | 11/2024 | Farrell | H01R 13/434 |

* cited by examiner

PRIMARY LOCK REINFORCEMENT FOR CONNECTOR LOCKING SYSTEM WITH RESILIENT AND RIGID LOCKING SURFACES

CROSS-REFERENCE TO RELATED APPLICATION

This application claims benefit of priority to Indian Provisional Patent Application No. 202341031486 filed on May 3, 2023, the entire disclosure of which is hereby incorporated by reference.

FIELD OF THE INVENTION

This patent application is directed to a connector assembly having primary lock reinforcement for connector locking system with resilient and rigid locking surfaces.

BACKGROUND

Connector assemblies, particularly electrical connector assemblies, have relied on interference between a resilient terminal lock in the terminal cavity of a connector housing and a primary lock reinforcement (PLR) device to inhibit movement of the PLR device from a pre-staged position to a fully staged position in the connector housing until a terminal is fully seated within the terminal cavity and secured within the terminal cavity by the resilient terminal lock. However, this design has experienced problems with providing a sufficient blocking force and may not properly detect whether the terminal is properly seated within the terminal cavity and engaged with the resilient terminal lock. Therefore, a connector assembly with a moveable PLR device that provides a sufficient blocking force and properly detects whether the terminal is properly seated within the terminal cavity and engaged with the resilient terminal lock remains desired.

BRIEF SUMMARY

According to one or more aspects of the present disclosure, a connector assembly includes: a connector body having a terminal cavity configured to receive a terminal and a cantilevered resilient primary terminal locking arm configured to secure the terminal within the terminal cavity. The terminal defines a terminal release ramp and a locking ridge configured to engage the terminal locking arm and secure the terminal within the terminal cavity. The connector assembly also has a primary lock reinforcement (PLR) device with a cantilevered resilient secondary terminal locking arm configured to inhibit the PLR device from moving from a pre-staged position to a fully staged position on the connector body prior to the terminal being inserted into the terminal cavity due to a blocking condition caused by interference between the secondary terminal locking arm and a cavity wall of the terminal cavity. The secondary terminal locking arm flexes outwardly due to contact with the terminal release ramp as the terminal is inserted within the terminal cavity, thereby clearing the blocking condition and allowing the PLR device to move from the pre-staged position to the fully staged position. The PLR device has a side wall that is radially offset by about 90 degrees from the secondary terminal locking arm inhibits outward flexing of the primary terminal locking arm and the secondary terminal locking arm engages the locking ridge when the PLR device is in the fully staged position.

In some aspects of the connector assembly described in the preceding paragraph, a free end of the secondary terminal locking arm defines a first blocking surface that is configured to engage a second blocking surface of the cavity wall to provide the blocking condition.

In some aspects of the connector assembly described in any one of the preceding paragraphs, the free end of the secondary terminal locking arm further defines a first ramp configured to contact the terminal and move the secondary terminal locking arm out of engagement with the second blocking surface and into engagement with a second ramp defined by the cavity wall as the terminal is inserted within the terminal cavity, thereby clearing the blocking condition and allowing the PLR device to move from the pre-staged position to the fully staged position. The first ramp is arranged at an acute angle relative to the first blocking surface.

In some aspects of the connector assembly described in any one of the preceding paragraphs, the free end of the secondary terminal locking arm further defines a latch surface generally parallel with the blocking surface configured engage a first edge of a first aperture in the cavity wall when the PLR device is in the pre-staged position and configured engage a second edge of a second aperture in the cavity wall when the PLR device is in the fully staged position.

In some aspects of the connector assembly described in any one of the preceding paragraphs, the latch surface is configured to engage the locking ridge of the terminal when the PLR device is in the fully staged position.

In some aspects of the connector assembly described in any one of the preceding paragraphs, the PLR device has a side wall that is radially offset by about 90 degrees from the secondary terminal locking arm and blocks outward flexing of the primary terminal locking arm when the PLR device is in the fully staged position.

In some aspects of the connector assembly described in any one of the preceding paragraphs, the connector body defines a pair of the primary terminal locking arm. The cavity wall defines a pair of the first aperture and a pair of the second aperture. The pair of the primary terminal locking arm is radially offset by about 90 degrees from the pair of the first aperture and the pair of the second aperture.

In some aspects of the connector assembly described in any one of the preceding paragraphs, the PLR device has a pair of the secondary terminal locking arm arranged radially opposite one another and a pair of side walls that is radially offset by about 90 degrees from the pair of the secondary terminal locking arm that blocks the pair of the primary terminal locking arm, thereby inhibiting the outward flexing of the pair of the primary terminal locking arm when the PLR device is in the fully staged position.

In some aspects of the connector assembly described in any one of the preceding paragraphs, the terminal is generally cylindrical. The terminal release ramp is circumferentially defined around the terminal. The locking ridge is circumferentially defined around the terminal.

In some aspects of the connector assembly described in any one of the preceding paragraphs, the PLR device, the terminal cavity, and the cavity wall are generally cylindrical.

In some aspects of the connector assembly described in any one of the preceding paragraphs, the terminal is a coaxial terminal having an outer shield portion that defines the terminal release ramp and the locking ridge.

According to one or more aspects of the present disclosure, a method of assembling a connector includes attaching a primary lock reinforcement (PLR) device to a connector body in a pre-staged position by inserting a free end of a cantilevered resilient secondary terminal locking arm into a first aperture defined by a cavity wall of a terminal cavity in the connector body. The PLR device is inhibited from moving from the pre-staged position to a fully staged position prior due to a blocking condition caused by interference between the secondary terminal locking arm and the cavity wall. The method also includes inserting a terminal within the terminal cavity. The secondary terminal locking arm flexes outwardly due to contact with a terminal release ramp of the terminal as the terminal is inserted within the terminal cavity, thereby clearing the blocking condition. The method further includes engaging a cantilevered resilient primary terminal locking arm defined by an outer wall of the terminal cavity with a locking ridge defined by the terminal, thereby securing the terminal within the terminal cavity. The method additionally includes moving the PLR device from the pre-staged position to the fully staged position, inserting a free end of the secondary terminal locking arm into a second aperture defined by a cavity wall, and engaging the free end with a locking ridge of the terminal when the PLR device is in the fully staged position.

In some aspects of the method described in the preceding paragraph, engagement of a free end of the secondary terminal locking arm having a first blocking surface with a second blocking surface of the cavity wall causes the blocking condition.

In some aspects of the method described in any one of the preceding paragraphs, the free end further defines a first ramp that contacts the terminal and moves the secondary terminal locking arm out of engagement with the second blocking surface and into engagement with a second ramp defined by the outer wall as the terminal is inserted within the terminal cavity, thereby clearing the blocking condition and allowing the PLR device to move from the pre-staged position to the fully staged position. The first ramp is arranged at an acute angle relative to the first blocking surface.

In some aspects of the method described in any one of the preceding paragraphs, the free end of the secondary terminal locking arm further defines a latch surface generally parallel with the blocking surface that engages a first edge of the first aperture when the PLR device is in the pre-staged position and configured engage a second edge of the second aperture when the PLR device is in the fully staged position.

In some aspects of the method described in any one of the preceding paragraphs, the latch surface engages the locking ridge of the terminal when the PLR device is in the fully staged position.

In some aspects of the method described in any one of the preceding paragraphs, the primary terminal locking arm is radially offset by about 90 degrees from the first aperture and the second aperture. The PLR device has a side wall that is radially offset by about 90 degrees from the secondary terminal locking arm that blocks the primary terminal locking arm and inhibits outward flexing of the primary terminal locking arm when the PLR device is in the fully staged position.

According to one or more aspects of the present disclosure, a connector assembly is manufactured by a process that includes attaching a primary lock reinforcement (PLR) device to a connector body in a pre-staged position by inserting a free end of a cantilevered resilient secondary terminal locking arm into a first aperture defined by a cavity wall of a terminal cavity in the connector body. The PLR device is inhibited from moving from the pre-staged position to a fully staged position prior due to a blocking condition caused by interference between the secondary terminal locking arm and the cavity wall. The process also includes inserting a terminal within the terminal cavity. The secondary terminal locking arm flexes outwardly due to contact with a terminal release ramp of the terminal as the terminal is inserted within the terminal cavity, thereby clearing the blocking condition. The process further includes engaging a cantilevered resilient primary terminal locking arm defined by an outer wall of the terminal cavity with a locking ridge defined by the terminal, thereby securing the terminal within the terminal cavity. The process additionally includes moving the PLR device from the pre-staged position to the fully staged position, inserting a free end of the secondary terminal locking arm into a second aperture defined by a cavity wall, and engaging the free end with a locking ridge of the terminal when the PLR device is in the fully staged position.

In some aspects of the connector assembly described in the preceding paragraph, a free end of the secondary terminal locking arm defines a first blocking surface that engages a second blocking surface of the cavity wall to provide the blocking condition when the PLR device is in the pre-staged position.

In some aspects of the connector assembly described in any one of the two preceding paragraphs, the free end further defines a first ramp that contacts the terminal and moves the secondary terminal locking arm out of engagement with the second blocking surface and into engagement with a second ramp defined by the outer wall as the terminal is inserted within the terminal cavity, thereby clearing the blocking condition and allowing the PLR device to move from the pre-staged position to the fully staged position. The first ramp is arranged at an acute angle relative to the first blocking surface. The free end of the secondary terminal locking arm further defines a latch surface generally parallel with the blocking surface that engages a first edge of the first aperture when the PLR device is in the pre-staged position and configured engage a second edge of the second aperture when the PLR device is in the fully staged position.

DETAILED DESCRIPTION

Figure 1:
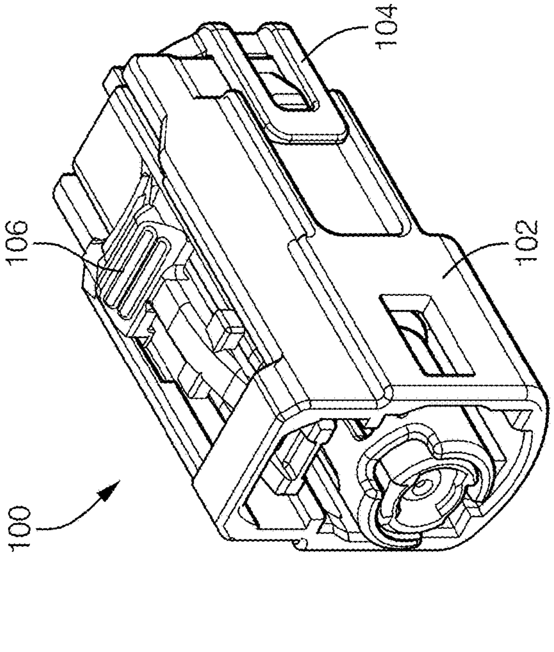
FIG. 1 is an isometric view of a connector assembly according to some embodiments.
Figure 2:
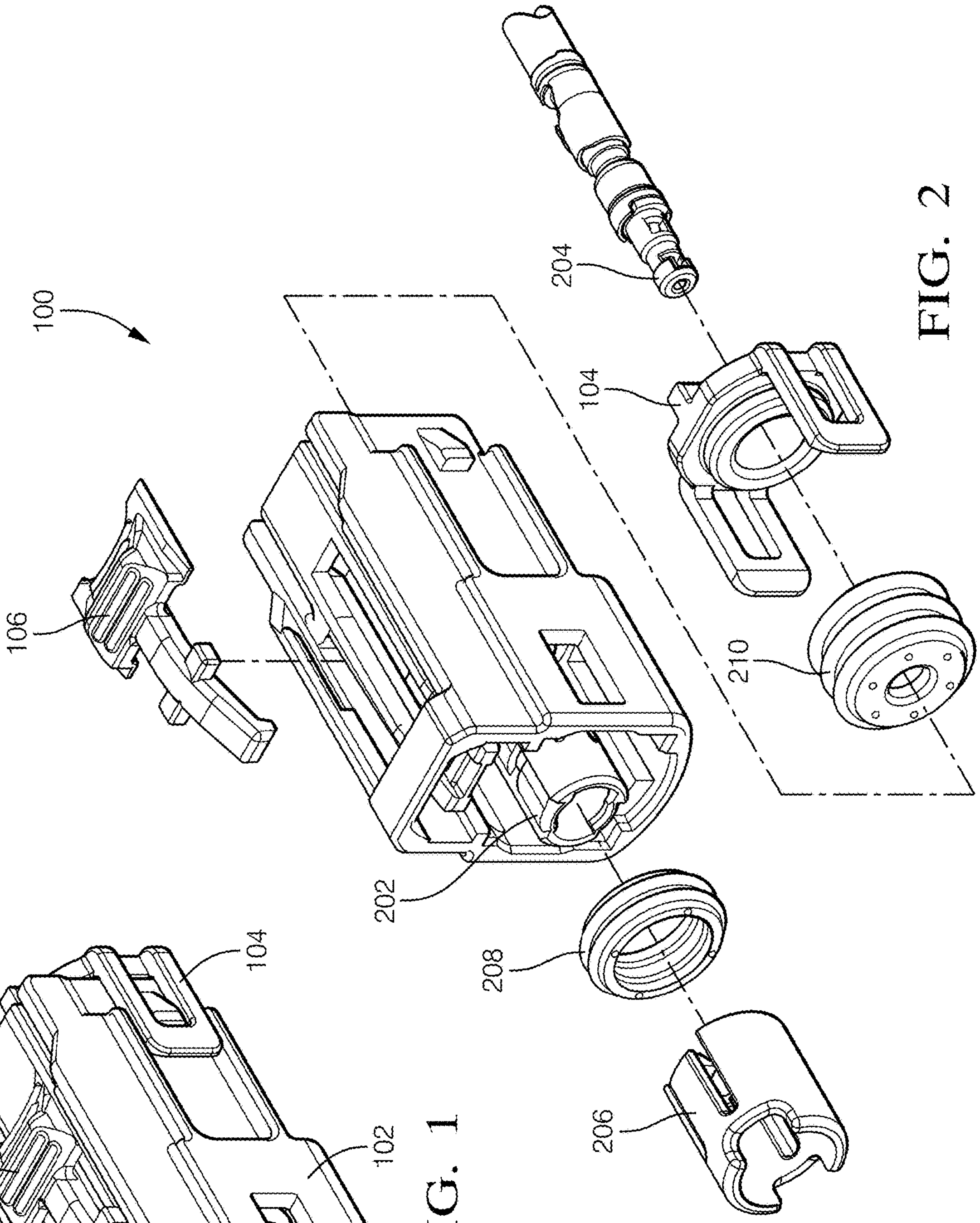
FIG. 2 is an exploded view of the connector assembly of FIG. 1 according to some embodiments.
Figure 3:
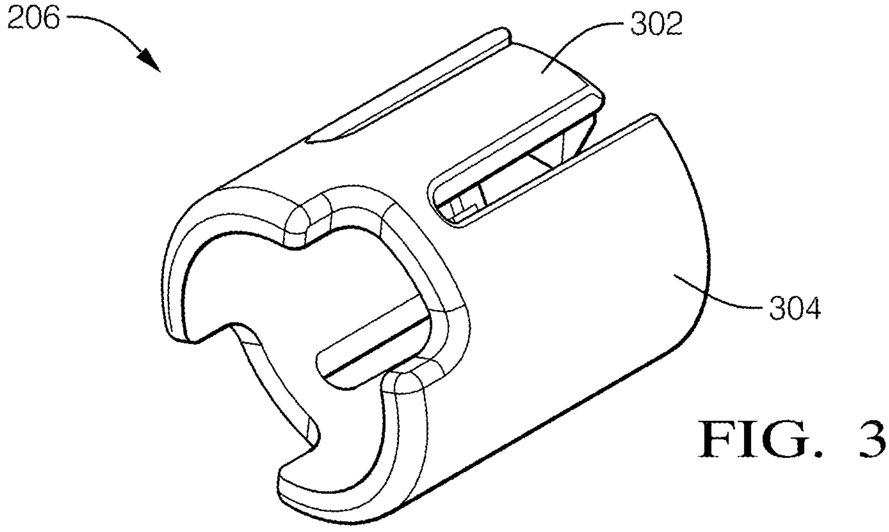
FIG. 3 is an isometric view of a primary lock retainer (PLR) device of the connector assembly of FIG. 1 according to some embodiments.
Figure 4:
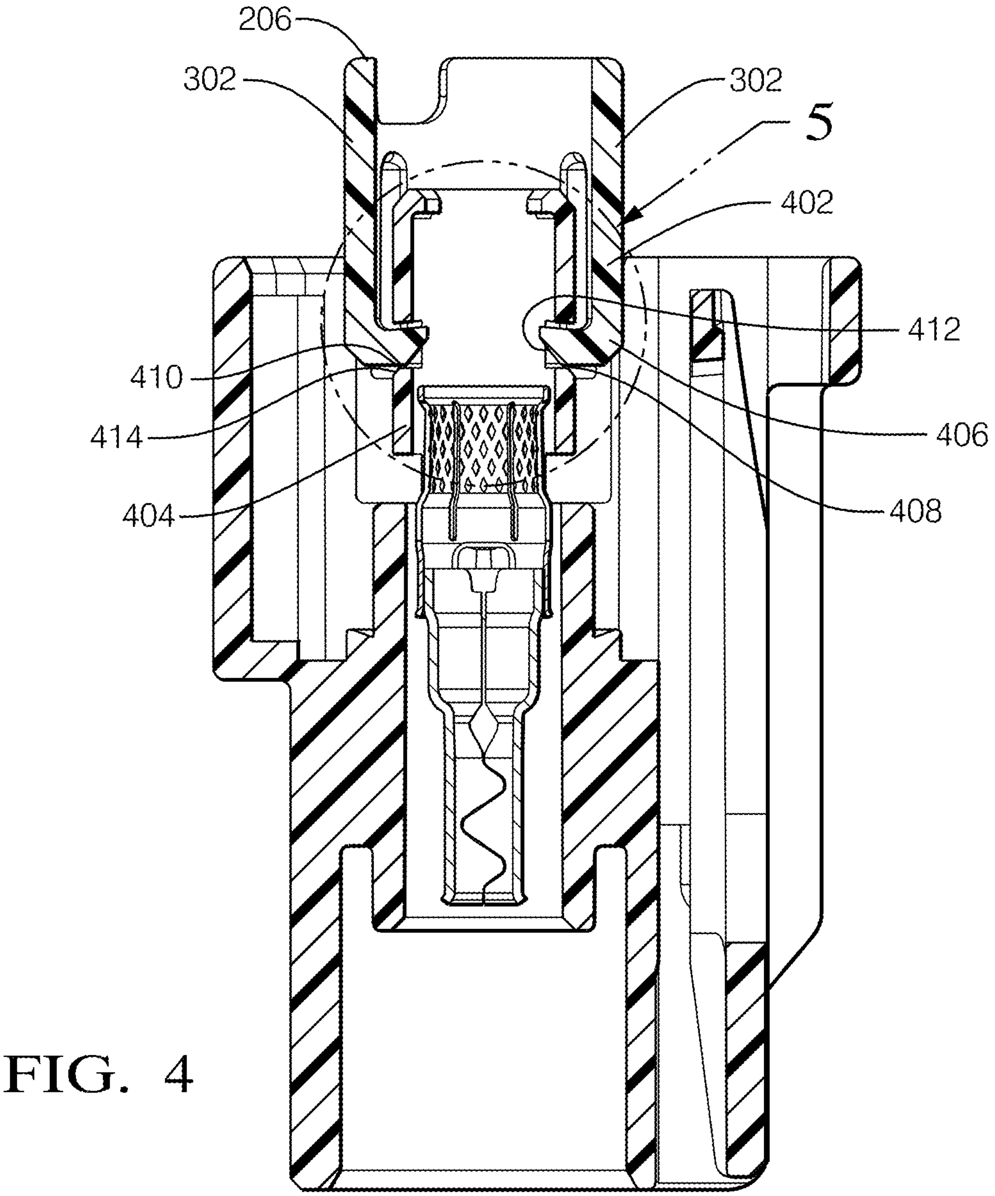
FIG. 4 is a side cross-sectional view of the connector assembly of FIG. 1 in a pre-staged condition according to some embodiments.
Figure 5:
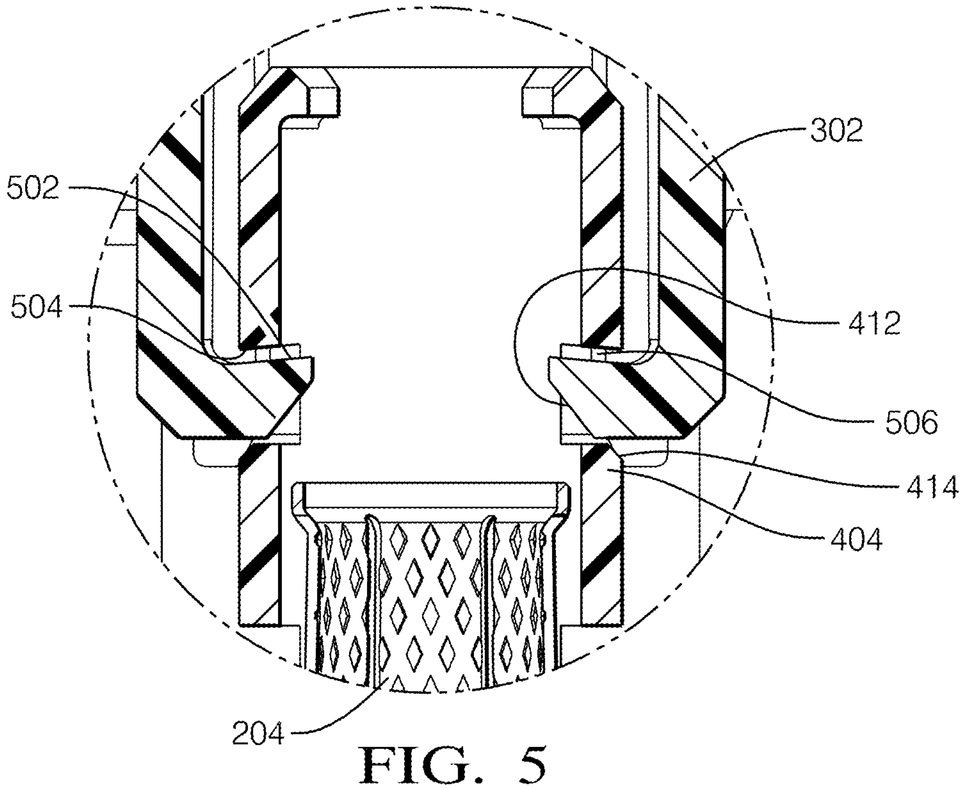
FIG. 5 is a close-up cross-sectional view of the PLR device 1 in the pre-staged condition of FIG. 4 according to some embodiments.
Figure 7:
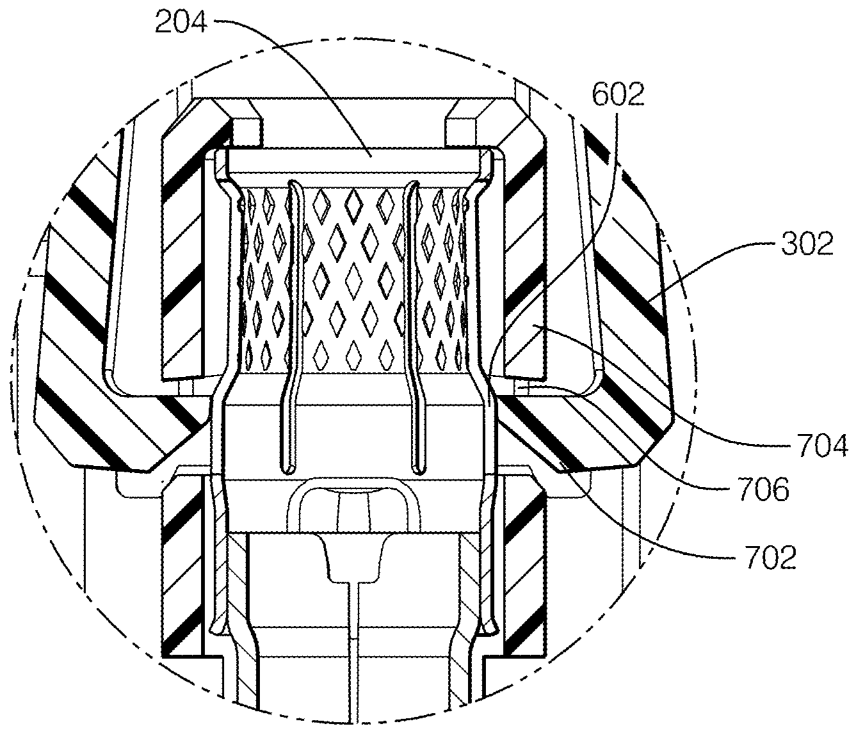
FIG. 7 is a close-up cross-sectional view of the connector assembly in the pre-staged condition of FIG. 6 as a terminal contacts locking arms of the PLR device according to some embodiments.
Figure 6:
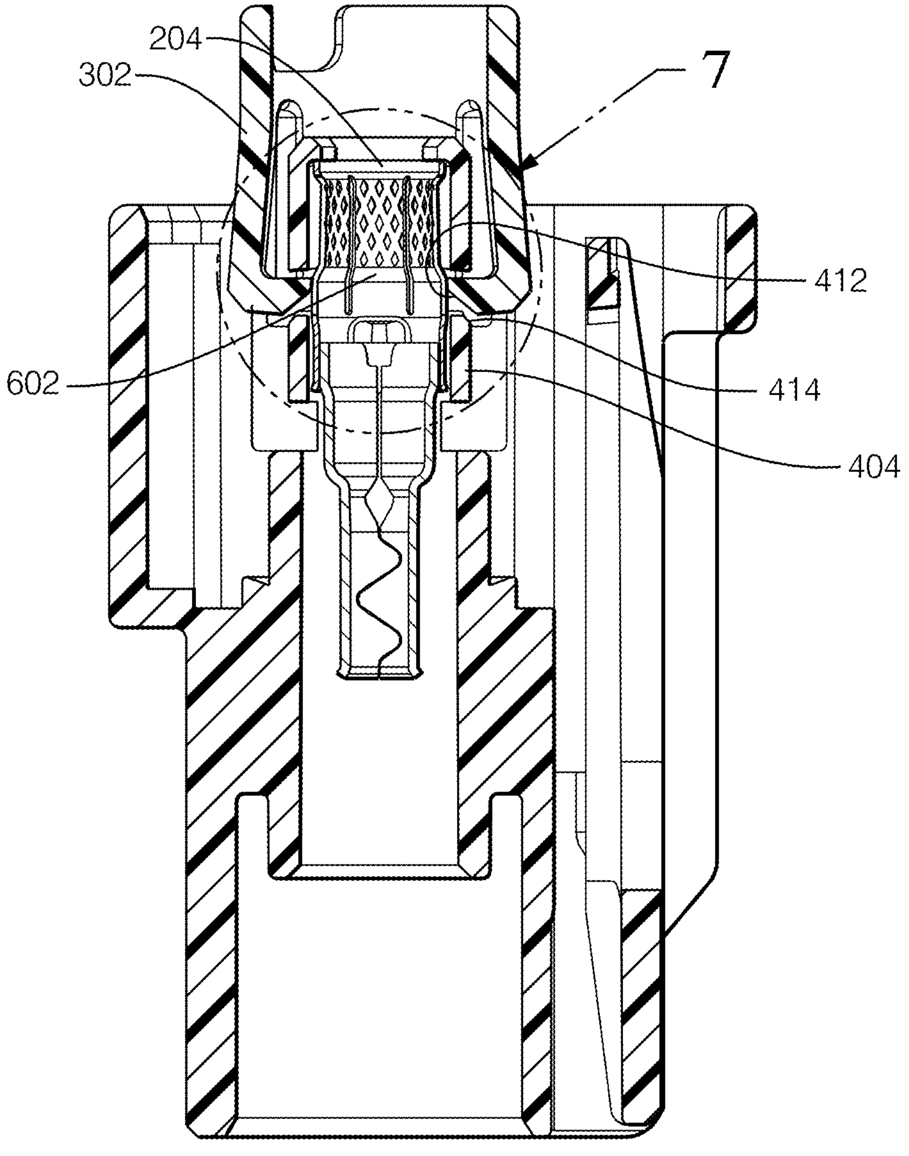
FIG. 6 is a side cross-sectional view of the connector assembly in the pre-staged condition as a terminal contacts locking arms of the PLR device according to some embodiments.
Figure 8:
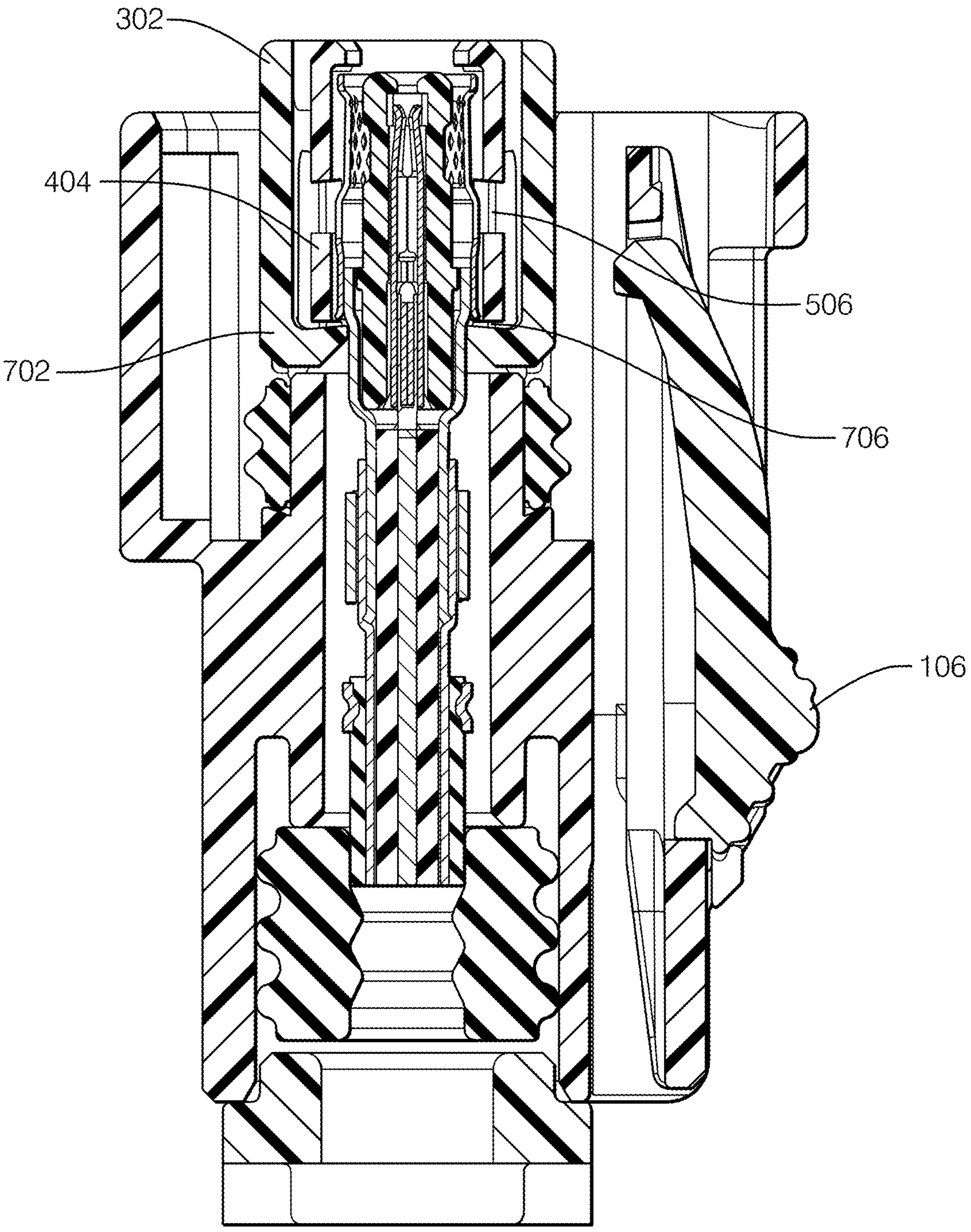
FIG. 8 is a side cross-sectional view of the connector assembly of FIG. 1 in a fully staged condition according to some embodiments.
Figure 9:
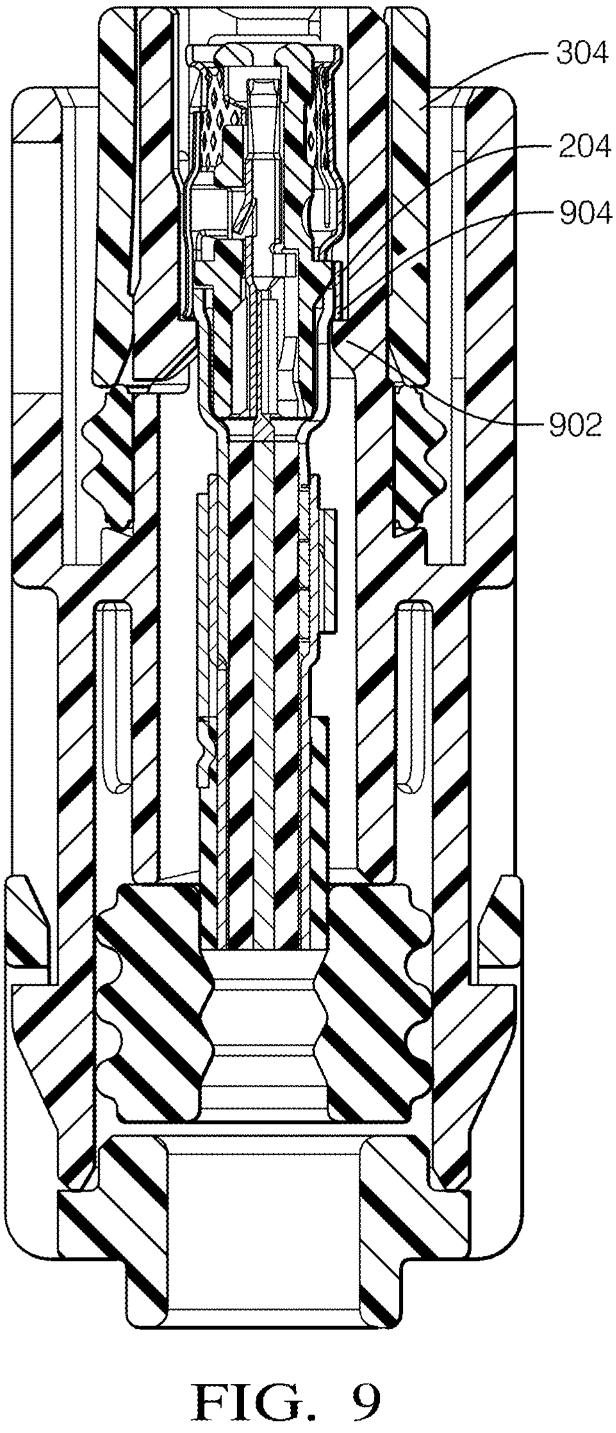
FIG. 9 is another side cross-sectional view of the connector assembly of FIG. 1 in the fully staged condition of FIG. 8 with the section plane rotated 90° relative to FIG. 8 according to some embodiments.

A connector assembly 100 as shown in FIGS. 1 to 9 includes a connector body 102 having a terminal cavity 202 that is configured to receive a terminal 204. The connector body 102 also has at least one cantilevered resilient primary terminal locking arm 902 (see FIG. 9) that is configured to secure the terminal 204 within the terminal cavity 202. As best shown in FIG. 7, the terminal 204 defines a terminal release ramp 602. The terminal 204 also defines a locking ridge 904 that is configured to engage the primary terminal locking arm 902 and secure the terminal within the terminal cavity 202. The connector assembly 100 further includes a primary lock reinforcement (PLR) device 206 that has at least one cantilevered resilient secondary terminal locking arm 302 (see FIG. 3) that is configured to inhibit the PLR device 206 from moving from a pre-staged position 402 shown in FIG. 4 to a fully staged position 702 shown in FIG. 8 on the connector body 102 prior to the terminal 204 being inserted into the terminal cavity 202 due to a blocking condition caused by interference between the secondary terminal locking arm 302 of the PLR device 206 and a cavity wall 404 of the terminal cavity 202 as shown in FIG. 4. As shown in FIG. 6, the secondary terminal locking arm 302 flexes outwardly due to contact with the terminal release ramp 602 on the terminal 204 as the terminal 204 is inserted within the terminal cavity 202, thereby clearing the blocking condition and allowing the PLR device 206 to move from the pre-staged position 402 to the fully staged position 702. A free end 406 of the secondary terminal locking arm 302 defines a first blocking surface 408 that is configured to engage a second blocking surface 410 of the cavity wall 404 to provide the blocking condition. The PLR device 206 has a side wall 304 that is radially offset by about 90 degrees from the secondary terminal locking arm 302 that inhibits outward flexing of the primary terminal locking arm 902. The secondary terminal locking arm 302 engages the locking ridge 904 of the terminal 204 when the PLR device 206 is in the fully staged position 702. The connector assembly 100 also includes a connector seal 208, a cable seal 210, a seal retainer 104, and a connector position assurance device 106.

The free end 406 of the secondary terminal locking arm 302 further defines a first ramp 412 configured to contact the terminal 204 and move the first blocking surface 408 of the secondary terminal locking arm 302 out of engagement with the second blocking surface 410 and into engagement with a second ramp 414 defined by the cavity wall 404 as the terminal 204 is inserted within the terminal cavity 202, thereby clearing the blocking condition and allowing the PLR device 206 to move from the pre-staged position 402 to the fully staged position 702. The first ramp 412 is arranged at an acute angle relative to the first blocking surface 408. The free end 406 of the secondary terminal locking arm 302 further defines a latch surface 502 (see FIG. 5) that is arranged generally parallel with the first blocking surface 408. The latch surface 502 is configured engage a first edge 504 of a first aperture 506 in the cavity wall 404 when the PLR device 206 is in the pre-staged position 402. The latch surface 502 engages a second edge 704 of a second aperture 706 in the cavity wall 404 when the PLR device 206 is in the fully staged position 702. The latch surface 502 also engages the locking ridge of the terminal 204 when the PLR device 206 is in the fully staged position 702.

The PLR device 206 has a side wall 304 that is radially offset by about 90 degrees from the secondary terminal locking arm 302 which blocks outward flexing of the primary terminal locking arm 902 when the PLR device 206 is in the fully staged position 702.

In the illustrated example, the connector body defines a pair of primary terminal locking arms, and the cavity wall defines a pair of first aperture and a pair of second apertures. The pair of the primary terminal locking arms are radially offset by about 90 degrees from the pair of first and second apertures.

Further, in the illustrated example, the PLR device has a pair of the secondary terminal locking arms that are arranged radially opposite one another and a pair of side walls that are radially offset by about 90 degrees from the pair of secondary terminal locking arms that blocks the pair of primary terminal locking arms.

The terminal in this example is generally cylindrical. The terminal release ramp is circumferentially defined around the terminal and wherein the locking ridge is circumferentially defined around the terminal. The terminal cavity and the cavity wall are also generally cylindrical.

In the illustrated example, the terminal is a coaxial terminal having an outer shield portion that defines the terminal release ramp and the locking ridge.

A method of assembling a connector, such as the connector assembly described above, includes the steps of:

- attaching a primary lock reinforcement (PLR) device to a connector body in a pre-staged position by inserting a free end of a cantilevered resilient secondary terminal locking arm into a first aperture defined by a cavity wall of a terminal cavity in the connector body, wherein the PLR device is inhibited from moving from the pre-staged position to a fully staged position prior due to a blocking condition caused by interference between the secondary terminal locking arm and the cavity wall;
- inserting a terminal within the terminal cavity, wherein the secondary terminal locking arm flexes outwardly due to contact with a terminal release ramp of the terminal as the terminal is inserted within the terminal cavity, thereby clearing the blocking condition;
- engaging a cantilevered resilient primary terminal locking arm defined by an outer wall of the terminal cavity with a locking ridge defined by the terminal, thereby securing the terminal within the terminal cavity;
- moving the PLR device from the pre-staged position to the fully staged position;
- inserting a free end of the secondary terminal locking arm into a second aperture defined by a cavity wall; and
- engaging the free end with a locking ridge of the terminal when the PLR device is in the fully staged position.

Engagement of a free end of the secondary terminal locking arm having a first blocking surface with a second blocking surface of the cavity wall causes the blocking condition.

The free end further defines a first ramp that contacts the terminal and moves the secondary terminal locking arm out of engagement with the second blocking surface and into engagement with a second ramp defined by the outer wall as the terminal is inserted within the terminal cavity, thereby clearing the blocking condition and allowing the PLR device to move from the pre-staged position to the fully staged position and wherein the first ramp is arranged at an acute angle relative to the first blocking surface.

The free end of the secondary terminal locking arm further defines a latch surface generally parallel with the blocking surface that engages a first edge of the first aperture when the PLR device is in the pre-staged position and configured engage a second edge of the second aperture when the PLR device is in the fully staged position.

The latch surface engages the locking ridge of the terminal when the PLR device is in the fully staged position.

The primary terminal locking arm is radially offset by about 90 degrees from the first aperture and the second aperture and wherein the PLR device has a side wall that is radially offset by about 90 degrees from the secondary terminal locking arm that blocks the primary terminal locking arm and inhibits outward flexing of the primary terminal locking arm when the PLR device is in the fully staged position.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector assembly, comprising:

a connector body having a terminal cavity configured to receive a terminal and a cantilevered resilient primary terminal locking arm configured to secure the terminal within the terminal cavity, wherein the terminal defines a terminal release ramp and a locking ridge configured to engage the terminal locking arm and secure the terminal within the terminal cavity; and a primary lock reinforcement (PLR) device having a cantilevered resilient secondary terminal locking arm configured to inhibit the PLR device from moving from a pre-staged position to a fully staged position on the connector body prior to the terminal being inserted into the terminal cavity due to a blocking condition caused by interference between the secondary terminal locking arm and a cavity wall of the terminal cavity, wherein the secondary terminal locking arm flexes outwardly due to contact with the terminal release ramp as the terminal is inserted within the terminal cavity, thereby clearing the blocking condition and allowing the PLR device to move from the pre-staged position to the fully staged position, and wherein the PLR device has a side wall that is radially offset by about 90 degrees from the secondary terminal locking arm inhibits outward flexing of the primary terminal locking arm and the secondary terminal locking arm engages the locking ridge when the PLR device is in the fully staged position.

2. The connector assembly in accordance with claim 1, wherein a free end of the secondary terminal locking arm defines a first blocking surface that is configured to engage a second blocking surface of the cavity wall to provide the blocking condition.

3. The connector assembly in accordance with claim 2, wherein the free end of the secondary terminal locking arm further defines a first ramp configured to contact the terminal and move the secondary terminal locking arm out of engagement with the second blocking surface and into engagement with a second ramp defined by the cavity wall as the terminal is inserted within the terminal cavity, thereby clearing the blocking condition and allowing the PLR device to move from the pre-staged position to the fully staged position and wherein the first ramp is arranged at an acute angle relative to the first blocking surface.

4. The connector assembly in accordance with claim 3, wherein the free end of the secondary terminal locking arm further defines a latch surface generally parallel with the blocking surface configured engage a first edge of a first aperture in the cavity wall when the PLR device is in the pre-staged position and configured engage a second edge of a second aperture in the cavity wall when the PLR device is in the fully staged position.

5. The connector assembly in accordance with claim 4, wherein the latch surface is configured to engage the locking ridge of the terminal when the PLR device is in the fully staged position.

6. The connector assembly in accordance with claim 5, wherein the PLR device has a side wall that is radially offset by about 90 degrees from the secondary terminal locking arm and blocks outward flexing of the primary terminal locking arm when the PLR device is in the fully staged position.

7. The connector assembly in accordance with claim 6, wherein the connector body defines a pair of the primary terminal locking arm, wherein the cavity wall defines a pair of the first aperture and a pair of the second aperture, and wherein the pair of the primary terminal locking arm is radially offset by about 90 degrees from the pair of the first aperture and the pair of the second aperture.

8. The connector assembly in accordance with claim 7, wherein the PLR device has a pair of the secondary terminal locking arm arranged radially opposite one another and a pair of side walls that is radially offset by about 90 degrees from the pair of the secondary terminal locking arm that blocks the pair of the primary terminal locking arm, thereby inhibiting the outward flexing of the pair of the primary terminal locking arm when the PLR device is in the fully staged position.

9. The connector assembly in accordance with claim 8, wherein the terminal is generally cylindrical, wherein the terminal release ramp is circumferentially defined around the terminal, and wherein the locking ridge is circumferentially defined around the terminal.

10. The connector assembly in accordance with claim 9, wherein the PLR device, the terminal cavity, and the cavity wall are generally cylindrical.

11. The connector assembly in accordance with claim 10, wherein the terminal is a coaxial terminal having an outer shield portion that defines the terminal release ramp and the locking ridge.

12. A method of assembling a connector, comprising:

attaching a primary lock reinforcement (PLR) device to a connector body in a pre-staged position by inserting a free end of a cantilevered resilient secondary terminal locking arm into a first aperture defined by a cavity wall of a terminal cavity in the connector body, wherein the PLR device is inhibited from moving from the pre-staged position to a fully staged position prior due to a blocking condition caused by interference between the secondary terminal locking arm and the cavity wall;

inserting a terminal within the terminal cavity, wherein the secondary terminal locking arm flexes outwardly due to contact with a terminal release ramp of the terminal as the terminal is inserted within the terminal cavity, thereby clearing the blocking condition;

engaging a cantilevered resilient primary terminal locking arm defined by an outer wall of the terminal cavity with a locking ridge defined by the terminal, thereby securing the terminal within the terminal cavity;

moving the PLR device from the pre-staged position to the fully staged position;

inserting a free end of the secondary terminal locking arm into a second aperture defined by a cavity wall; and engaging the free end with a locking ridge of the terminal when the PLR device is in the fully staged position.

13. The method in accordance with claim 12, wherein engagement of a free end of the secondary terminal locking arm having a first blocking surface with a second blocking surface of the cavity wall causes the blocking condition.

14. The method in accordance with claim 13, wherein the free end further defines a first ramp that contacts the terminal and moves the secondary terminal locking arm out of engagement with the second blocking surface and into engagement with a second ramp defined by the outer wall as the terminal is inserted within the terminal cavity, thereby clearing the blocking condition and allowing the PLR device to move from the pre-staged position to the fully staged position and wherein the first ramp is arranged at an acute angle relative to the first blocking surface.

15. The method in accordance with claim 14, wherein the free end of the secondary terminal locking arm further defines a latch surface generally parallel with the blocking surface that engages a first edge of the first aperture when the PLR device is in the pre-staged position and configured engage a second edge of the second aperture when the PLR device is in the fully staged position.

16. The method in accordance with claim 15, wherein the latch surface engages the locking ridge of the terminal when the PLR device is in the fully staged position.

17. The method in accordance with claim 16, wherein the primary terminal locking arm is radially offset by about 90 degrees from the first aperture and the second aperture and wherein the PLR device has a side wall that is radially offset by about 90 degrees from the secondary terminal locking arm that blocks the primary terminal locking arm and inhibits outward flexing of the primary terminal locking arm when the PLR device is in the fully staged position.

18. A connector assembly manufactured by a process, comprising:

attaching a primary lock reinforcement (PLR) device to a connector body in a pre-staged position by inserting a free end of a cantilevered resilient secondary terminal locking arm into a first aperture defined by a cavity wall of a terminal cavity in the connector body, wherein the PLR device is inhibited from moving from the pre-staged position to a fully staged position prior due to a blocking condition caused by interference between the secondary terminal locking arm and the cavity wall;

inserting a terminal within the terminal cavity, wherein the secondary terminal locking arm flexes outwardly due to contact with a terminal release ramp of the terminal as the terminal is inserted within the terminal cavity, thereby clearing the blocking condition;

engaging a cantilevered resilient primary terminal locking arm defined by an outer wall of the terminal cavity with a locking ridge defined by the terminal, thereby securing the terminal within the terminal cavity;

moving the PLR device from the pre-staged position to the fully staged position;

inserting a free end of the secondary terminal locking arm into a second aperture defined by a cavity wall; and engaging the free end with a locking ridge of the terminal when the PLR device is in the fully staged position.

19. The connector assembly in accordance with claim 18, wherein a free end of the secondary terminal locking arm defines a first blocking surface that engages a second blocking surface of the cavity wall to provide the blocking condition when the PLR device is in the pre-staged position.

20. The connector assembly in accordance with claim 19, wherein the free end further defines a first ramp that contacts the terminal and moves the secondary terminal locking arm out of engagement with the second blocking surface and into engagement with a second ramp defined by the outer wall as the terminal is inserted within the terminal cavity, thereby clearing the blocking condition and allowing the PLR device to move from the pre-staged position to the fully staged position and wherein the first ramp is arranged at an acute angle relative to the first blocking surface and wherein the free end of the secondary terminal locking arm further defines a latch surface generally parallel with the blocking surface that engages a first edge of the first aperture when the PLR device is in the pre-staged position and configured engage a second edge of the second aperture when the PLR device is in the fully staged position.

* * * * *